(12) United States Patent
Van Den Engel (10) Patent No.: US 7,398,983 B2
(45) Date of Patent: Jul. 15, 2008

(54) HAYMAKING MACHINE AND A MACHINE

(75) Inventor: Alfonsus Jacobus Van Den Engel, Schiedam (NL)

(73) Assignee: Lely Enterprises AG, Zug (CH)

(*) Notice: Subject to any disclaimer, the term of this patent is extended or adjusted under 35 U.S.C. 154(b) by 0 days.

(21) Appl. No.: 11/475,215

(22) Filed: Jun. 27, 2006

(65) Prior Publication Data

US 2006/0288684 A1 Dec. 28, 2006

(30) Foreign Application Priority Data

Jun. 28, 2005 (NL) .................................. 1029351

(51) Int. Cl.
*B60G 5/00* (2006.01)
*B60G 21/00* (2006.01)
*B60G 21/04* (2006.01)

(52) U.S. Cl. ..................................... 280/104
(58) Field of Classification Search ................ 280/104, 280/682, 81.1, 677, 64, 43.23, 124.102; 180/24.02, 180/5.2; 172/240, 466, 400, 413, 311; 37/424, 37/425, 403, 429; 56/15.8
See application file for complete search history.

(56) References Cited

U.S. PATENT DOCUMENTS

| | | | | |
|---|---|---|---|---|
| 2,141,805 A | * | 12/1938 | White | 172/240 |
| 3,756,619 A | * | 9/1973 | Thorsell | 280/104 |
| 3,870,107 A | * | 3/1975 | Orthman | 172/413 |
| 4,026,365 A | * | 5/1977 | Andersson et al. | 172/386 |
| 4,317,489 A | * | 3/1982 | Steinbach | 172/400 |
| 4,397,473 A | * | 8/1983 | Miles et al. | 280/64 |
| 4,529,215 A | * | 7/1985 | Strand | 280/43.23 |
| 4,840,394 A | * | 6/1989 | Bickler | 280/677 |
| 4,974,684 A | * | 12/1990 | Stevens | 172/311 |
| 5,086,847 A | * | 2/1992 | Meiners | 172/466 |

(Continued)

FOREIGN PATENT DOCUMENTS

DE 9109324 U1 9/1991

(Continued)

OTHER PUBLICATIONS

Report of a novelty search of International type.

*Primary Examiner*—Árpád Fábián-Kovács
(74) *Attorney, Agent, or Firm*—David P. Owen; Jacobus C. Rasser; Howrey LLP (57) ABSTRACT

A haymaking machine comprising a frame and a rotatable processing member for crop processing. The processing member is connected with the frame and supported from the ground via a supporting device, which comprises at least one balance arm that is mounted on a substantially horizontal pivot axis and is provided with a wheel at each of its ends. During the crop processing, the wheels bear on the ground, the supporting device further being provided with an element for moving, for transport of the haymaking machine, the balance arm about its pivot axis to an oblique position in which the wheel at one of the ends of the balance arm is located at some distance from the ground. The balance arm comprises two balance arm portions that are movable relative to each other, each balance arm portion having a first end and a second end, the balance arm portions supporting the respective wheel at their first end and being interconnected at their second end.

19 Claims, 5 Drawing Sheets

U.S. PATENT DOCUMENTS 5,482,326 A * 1/1996 Levi .................... 280/682
5,655,615 A * 8/1997 Mick .................... 180/24.02
6,625,967 B1 * 9/2003 Coisnon .................... 56/15.8

FOREIGN PATENT DOCUMENTS

| | | | |
|---|---|---|---|
| EP | 383120 | A1 | 8/1990 |
| EP | 857413 | B1 | 8/1998 |
| EP | 876751 | A1 | 11/1998 |
| EP | 1125491 | A1 | 8/2001 |
| FR | 2798817 | A1 | 3/2001 |

* cited by examiner

HAYMAKING MACHINE AND A MACHINE

CROSS REFERENCE TO RELATED APPLICATIONS

This application claims priority from Dutch application No. 1029351 filed on 28th Jun. 2005, the contents of which are hereby incorporated by reference in their entirety.

BACKGROUND OF THE INVENTION

1. Field of the Invention

The present invention relates to crop processing machines, in particular, haymaking machines for processing mown grass.

2. Description of the Related Art

A haymaking machine is known from EP B1 0 857 413, the contents of which are incorporated herewith by reference in their entirety. This device is provided with a cross beam in which an upwardly orientated axis is included for supporting a rotatable processing member, each of the ends of the crossbeam being provided with a supporting device. Each supporting device comprises two wheels, one at each end of a balance arm. During operation, a cylinder is operated in such a way that the two wheels of a supporting device support the haymaking machine. For transport, an operating cylinder is operated in such a way that one wheel of each supporting device is lifted, as a result of which the balance arms will assume an oblique position. Although this device generally functions properly, the clearance between the rotor, the processing member, and the ground during transport leaves room for improvement. The oblique position of the balance arm is limited owing to the fact that, in case of a too oblique position of the balance arm, the wheel at the lifted end of the balance arm could interfere with the rotor.

There is thus a need to provide an alternative device, which provides improved clearance between the ground and the rotor during transport of the haymaking machine.

BRIEF SUMMARY OF THE INVENTION

According to the invention, there is thus provided a crop processing machine comprising a frame for supporting at least one processing member for processing crop lying on the ground and a supporting device, supporting the frame and the processing member from the ground. The supporting device is provided with at least one balance arm mounted on a substantially horizontal pivot axis and provided with first and second balance arm portions, movable relative to each other, each balance arm portion having a first end supporting a respective wheel and a second end, the balance arm portions being connected at their second ends such that an angle between the balance arm portions in an operative position differs from the angle between the balance arm portions in a transport position for transport of the haymaking machine. Furthermore, there is provided an element acting to pivot at least one balance arm portion to the transport position in which the angle between the balance arm portions is reduced and in which at least one of the wheels is raised to a distance from the ground. The invention is based on the insight that, in the case of the known haymaking machine, the cause of the problems is that the balance arm is a rigid arm. By using two balance arm portions that are movable relative to each other according to the invention, it is possible to obtain, during transport of the haymaking machine, a greater distance between the ground and the rotor, and the processing member, while in the operative position, i.e. during the processing of the crop lying on the ground, the balance arm extends at any rate at least substantially horizontally, for the purpose of achieving a correct crop processing. In this manner also, in the operative position, the balance arm including the two balance arm portions can rotate as a unit about the pivot point to adapt to the terrain.

Although the relative movement of the balance arm portions may be controlled, for example by means of hydraulic or pneumatic cylinders, for the sake of simplicity of operation the balance arm portions are preferably freely movable relative to each other when the haymaking machine is moved from the operative position, in which crop lying on the ground is being processed, to the transport position.

According to the invention, the working height of the haymaking machine can be adjusted in a simple manner if one of the balance arm portions is provided with a stop and if the other balance arm portion is provided with a protrusion, the arrangement being such that, during the processing of crop lying on the ground, the protrusion bears on the stop by the weight of the haymaking machine, the position of the stop on the one balance arm portion being adjustable. Alternatively, the position of the protrusion on the other balance arm portion can be adjustable.

If a stop is disposed near each end of the crossbeam, and if each other balance arm portion is provided with a further protrusion, so that the further protrusion of the other balance arm portion bears on the respective stop of the cross beam during transport of the haymaking machine, it is possible to ensure, by means of a correct relative arrangement, that the wheel which is clear of the ground is located at a sufficient distance from the rotor and the other wheel and/or the ground.

The stop near each end of the crossbeam is preferably constituted by the respective edge of a slotted hole.

If the crossbeam is provided with auxiliary protrusions, which press on at least one of the balance arm portions by the weight of the haymaking machine during the processing of crop lying on the ground by means of the haymaking machine, the weight of the haymaking machine is distributed between the stop of the first balance arm portion and the balance arm portion itself, which leads to less wear being caused to the relevant individual components.

The invention also relates to a machine as claimed in claim 12, comprising a supporting device for supporting the machine from the ground, the supporting device being provided with at least one balance arm that is mounted on a substantially horizontal pivot axis and is provided with wheels, the supporting device further being provided with an element for moving, for transport of the machine, the balance arm about its pivot axis to an oblique position in which at least one of the wheels, but not all the wheels, is located at some distance from the ground, so that the machine is moved from an operative position, in which the wheels bear on the ground, to a transport position, in which at least one of the wheels is located at some distance from the ground, characterized in that the balance arm comprises two balance arm portions that are movable relative to each other, each balance arm portion having a first end and a second end, the balance arm portions supporting the respective wheel at their first end and being interconnected at their second end, so that the angle between the balance arm portions in the operative position differs from the angle between the balance arm portions in the transport position. This aspect of the invention is based on the insight that the supporting device according to the invention is not only applicable to a haymaking machine, but also to other agricultural machines, and other machines which are supported from the ground via a supporting device comprising at least one balance arm that is mounted on a substantially horizontal pivot axis.

For the sake of clarity, only a part of the haymaking machine according to the present invention is shown in FIGS. 1 to 5, which part is relevant to the present invention. The crop processing member, which comprises a rotor that is rotatable about a vertical axis which is disposed in the aperture 1 for including the axis, is not shown. Furthermore, inter alia the operating member for the supporting device, for example a hydraulic or pneumatic cylinder, for bringing the supporting device from an operative position to a transport position, is neither shown. These and other components are described for example in EP B1 0 857 413.

BRIEF DESCRIPTION OF THE DRAWINGS

The invention will now be described by way of example with reference to an embodiment of a haymaking machine shown in the drawings, in which.

DESCRIPTION OF ILLUSTRATIVE EMBODIMENTS

Figure 1:
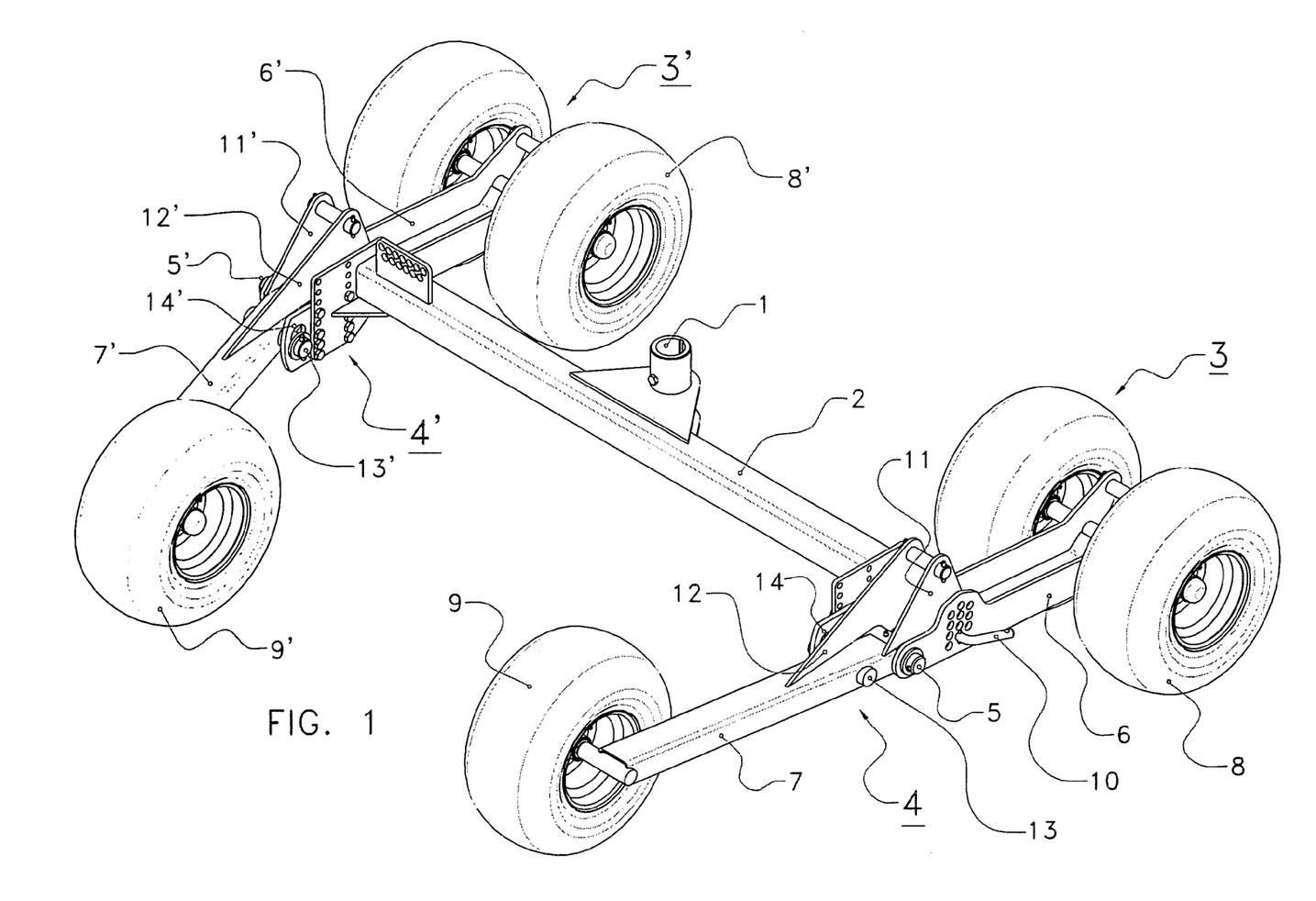
FIG. 1 is a schematic side view of a component of a haymaking machine according to the invention in the operative position, comprising two supporting devices, which are each disposed at each end of a crossbeam.

The following is a description of certain embodiments of the invention, given by way of example only and with reference to the drawings. Referring to FIG. 1, a part of the frame of a haymaking machine is depicted in FIG. 1 in a perspective view, showing the situation in which the haymaking machine is performing the crop processing. In the aperture 1 is included a (non-shown) axis about which a (non-shown) processing member is rotatable for processing crop lying on the ground. The frame is provided with a crossbeam 2 in which the aperture 1 for including the upwardly orientated axis is provided.

Each end of the crossbeam 2 is provided with a supporting device 3, 3'. Each supporting device 3, 3' comprises a balance arm 4, 4' that is mounted on a substantially horizontal pivot axis 5, 5'. Each balance arm 4, 4' comprises two balance arm portions 6, 7, 6', 7' that are movable relative to each other, each balance arm portion having a first end and a second end. The balance arm portions support the respective wheel 8, 9, 8', 9' at their first end. At their second end the balance arm portions 6, 7, 6', 7' are interconnected, preferably at the place of the pivot axis 5, 5', so that the balance arm portions 6, 7, 6', 7' are mounted pivotably relative to each other about the pivot axis 5, 5'. Preferably, the wheel at at least one of the ends of the balance arms is a double wheel; in the embodiment shown, the wheel 8 is a double wheel.

Figure 2:
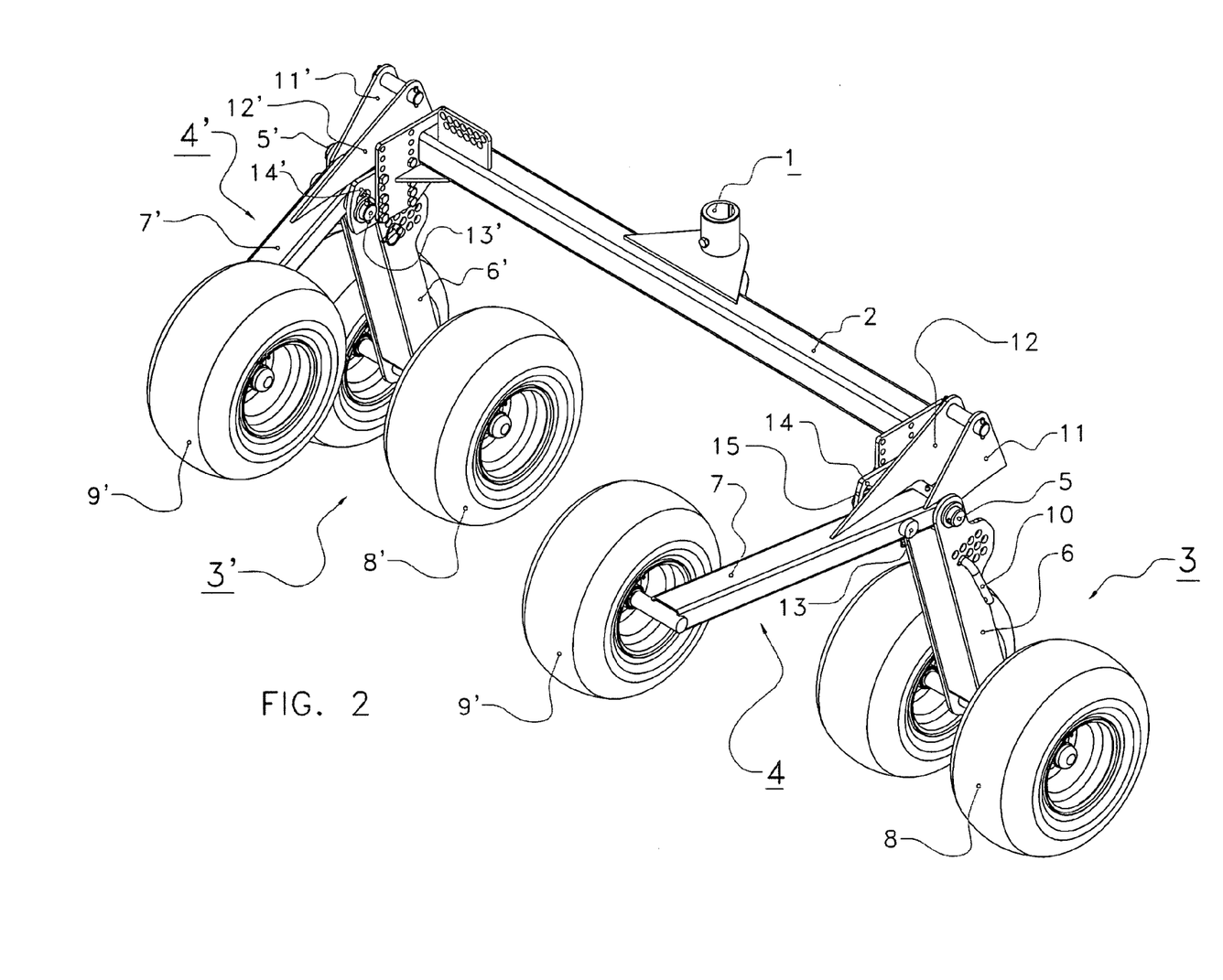
FIG. 2 is a schematic side view of a component of a haymaking machine according to the invention in the transport position, comprising two supporting devices, which are each disposed at an end of a crossbeam.
Figure 3:
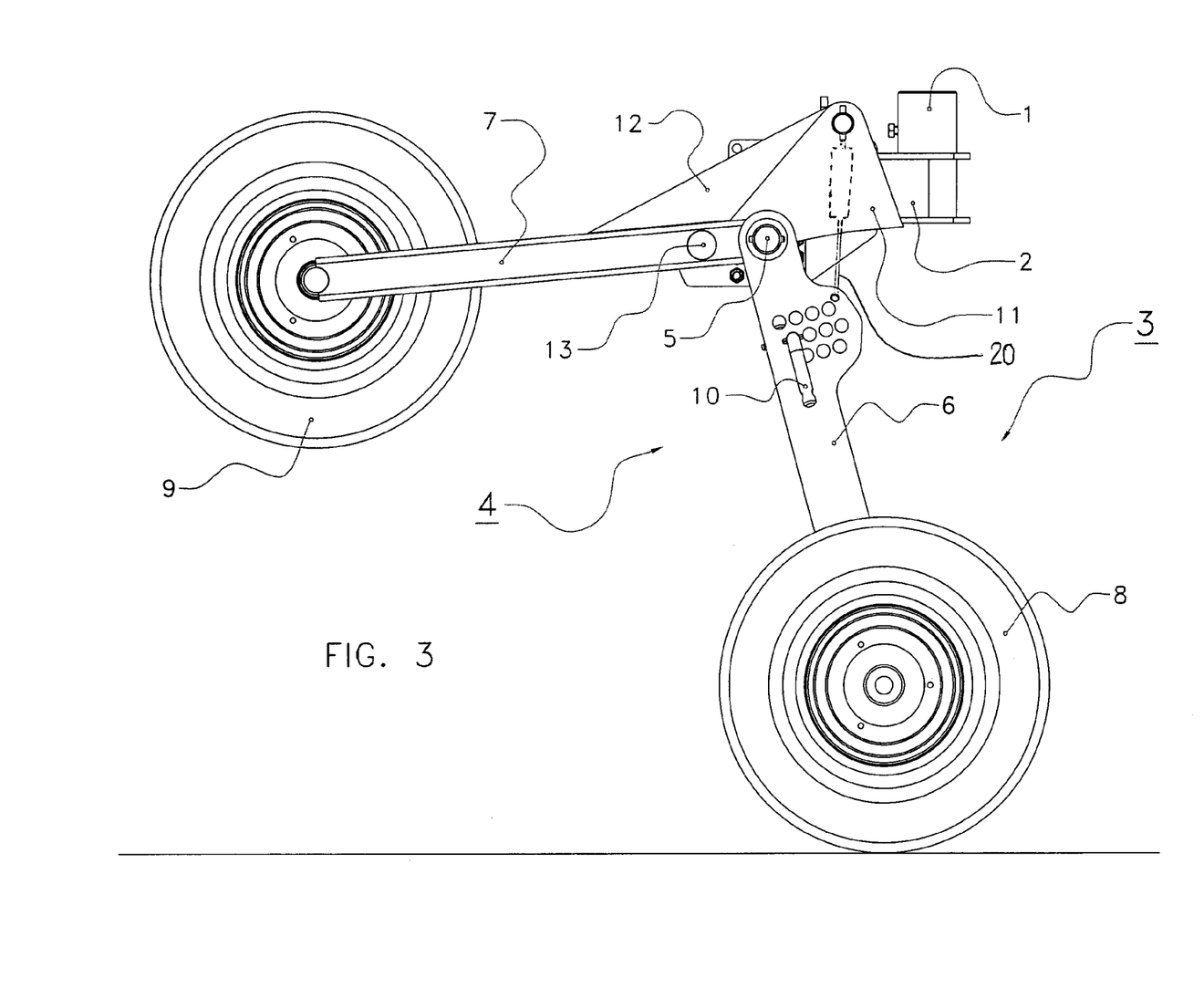
FIG. 3 is a side view of FIG. 2.
Figure 4:
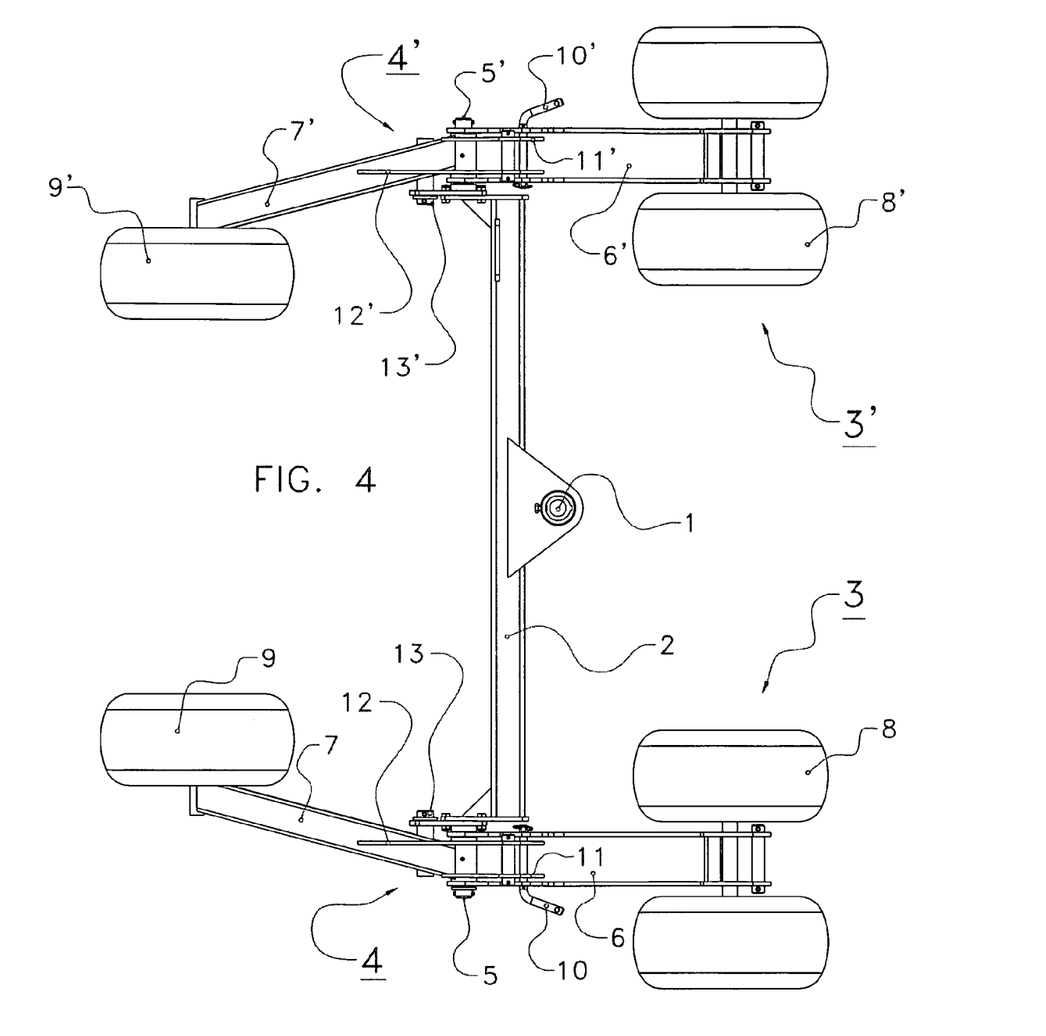
FIG. 4 is a plan view of FIG. 1.
Figure 5:
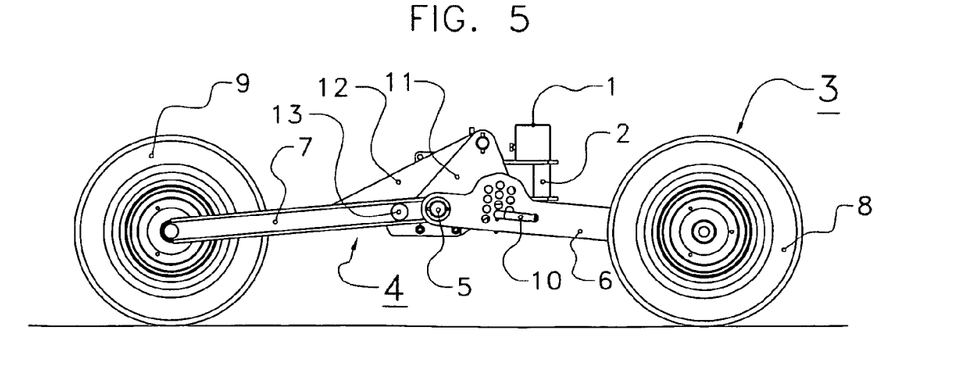
FIG. 5 is a side view of FIG. 4.

An operating element 20 (FIG. 3), for example a hydraulic or pneumatic cylinder, acts on the one balance arm portion 6, 6', so that the supporting device 3, 3' is capable of being brought, by operating the operating element, from an operative position, as shown in FIGS. 1, 4 and 5, to a transport position, as shown in FIGS. 2 and 3 (analogously to EP B1 0 857 413). In the transport position, the balance arm assumes a different position (the so-called oblique position) to that in the operative position in which the balance arm portions extend at least substantially horizontally. Owing to the fact that the balance arm portions 6, 7, 6', 7' are movable relative to each other, the angle formed between the balance arm portions 6, 7, 6', 7' in the operative position differs from the angle between the balance arm portions 6, 7, 6', 7' in the transport position. The difference between the angle between the balance arm portions in the operative position and the angle between the balance arm portions in the transport position lies preferably in the range between approximately 30° and approximately 90°. This difference is clearly visible by comparing FIGS. 3 and 5 with each other.

It is also possible to cause an operating element to act on the other balance arm portion 7, 7', which operating element can be active independently of the operating element for the one balance arm portion 6, 6'. Therefore, by correctly operating the operating elements, the balance arm portions 6, 7, 6', 7' are movable relative to each other, so that the angle between the balance arm portions is adjustable. However, the balance arm portions are preferably designed so as to be freely movable relative to each other, so that there is only required an operating element to bring the haymaking machine from the operative position to the transport position, the balance arm portions 6, 7, 6', 7' then moving automatically relative to each other.

In the embodiment shown, this free relative movement is achieved as follows. The one balance arm portion 6, 6' is provided with a stop 10, 10'. In the operative position, against said stop 10, 10' are/is located a protrusion of the other balance arm portion 7, 7' and/or a first auxiliary protrusion 11, 11', which is disposed on the crossbeam 2 at its end, the weight of the haymaking machine ensuring that the respective protrusions bear on the stops. In this case, the position of the stop 10, 10' on the one balance arm portion 6, 6' is adjustable, so that the working height of the haymaking machine can be adapted. In the embodiment shown in the figures, the adjustment is achieved by a number of apertures that are provided in a (possibly integrated) plate on the one balance arm portion, through which apertures it is possible to put a pin which serves as a stop.

A second auxiliary protrusion 12, 12' bears on the other balance arm portion 7, 7' in the operative position of the haymaking machine and thus also absorbs a part of the weight of the haymaking machine. The second auxiliary protrusions 12, 12' can be dimensioned such that they also bear on the one balance arm portion 6, 6'. Furthermore, the first auxiliary protrusions 11, 11 ' can also be dimensioned such that they bear on the other balance arm portion 7, 7' when the haymaking machine is in the operative position.

A further stop is constituted by a pin 13 extending through a slotted hole 14 which is disposed in a plate 15 mounted on the crossbeam 2 (FIG. 2). When the haymaking machine is in the operative position, the pin 13, 13' is located against the upper edge of the slotted hole 14, 14'. When the wheel 9 gets into a hole in the ground, said wheel can freely go down in the hole, according to the length of the slotted hole. This makes it possible to obtain a better track-following. When the haymaking machine is brought from the operative position to the transport position by activating the operating element, which acts on the one balance arm portion 6, 6', the wheel 8 is moved from the position shown in FIG. 5 to a forward position in the normal direction of travel of the haymaking machine. This means that the wheel, seen in side view, will be located rather under the aperture 1 for including the rotor shaft. Simultaneously with the lifting to the transport position, the pin 13 will move freely in the slotted hole 14 until it will be located against the lower edge of the slotted hole 14. The length of the slotted hole 14 is chosen in such a way that the above-mentioned angle difference is achieved. This results in that the wheel 8, seen in side view, will be located under the aperture 1 provided in the crossbeam 2, so that a higher transport height is achieved, the arrangement being such that the wheel 9, because of the angle difference caused by the relative movement of the balance arm portions, will not come into contact with the processing member. An extremely stable and safe transport position is thus obtained.

Figure 6:
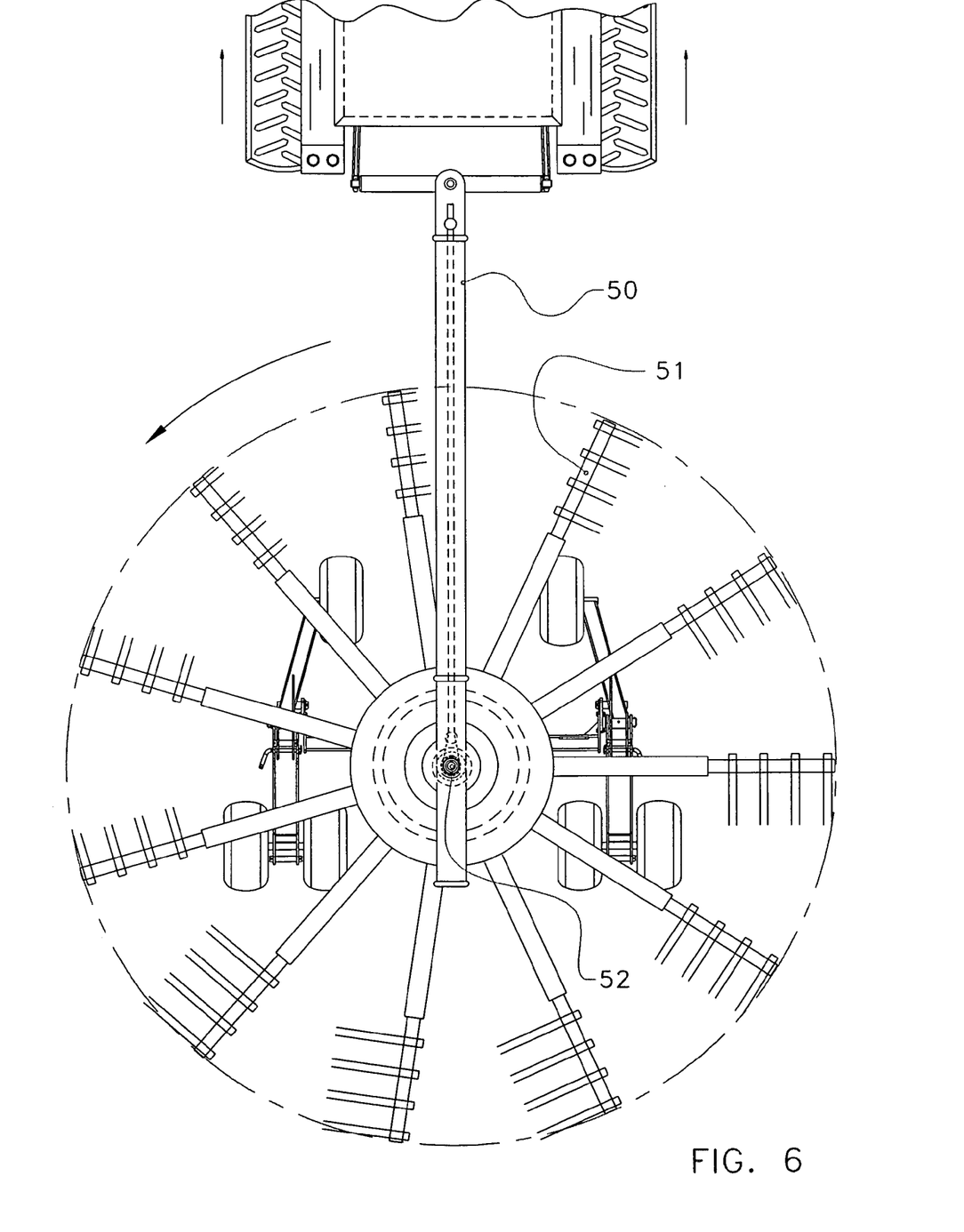
FIG. 6 is a schematic plan view of a haymaking machine according to an embodiment of the invention.

FIG. 6 shows a schematic plan view of a haymaking machine according to an embodiment of the invention. The haymaking machine comprises a frame 50 and a rotatable processing member 51 for crop processing, rotating about a vertical axis 52. The processing member 51 is connected with the frame 50 and is supported above the ground via a supporting device as described in detail in relation to FIG. 4.

It will be obvious that the invention is not limited to the exemplary embodiment described above with reference to the figures. For example, the invention is not only applicable to a haymaking machine, such as a rake or tedder, but to all agricultural and other machines that are supported from the ground by means of a supporting device which comprises at least one balance arm that is mounted on a substantially horizontal pivot axis, and which is provided at each of its ends with a wheel. Although in the embodiments shown, the processing device is mounted for rotation about a vertical axis, devices rotating about other axes or non-rotating devices may also be considered.

Furthermore, in the embodiment shown, the movement of the balance arm portions is achieved in that the two balance arm portions are rotatable about a common pivot axis. However, it will be obvious that there may be provided an individual pivot axis for each balance arm portion, in which case it will even not be necessary for one of these individual pivot axes to coincide with the pivot axis 5, 5'. It has further been described that wheels are provided at the end of a balance arm portion. However, it will be obvious that the invention is not limited to wheels that are disposed exactly at the end of the balance arm portions, but that the invention also relates to wheels that are disposed at some distance from, i.e. in the proximity of, the end of the balance arms. It will be obvious that the features of the preferred embodiments of the haymaking machine, as described in the dependent claims, are also applicable to the machine as claimed in claim 12.

Thus, the invention has been described by reference to certain embodiments discussed above. It will be recognized that these embodiments are susceptible to various modifications and alternative forms well known to those of skill in the art, without departing from the spirit and scope of the invention. Accordingly, although specific embodiments have been described, these are examples only and are not limiting upon the scope of the invention.

What is claimed is:

1. A crop processing machine comprising:
    a frame for supporting at least one processing member for processing crop lying on the ground;
    a supporting device, supporting the frame and the processing member from the ground, the supporting device comprising:
    at least one balance arm mounted on a substantially horizontal pivot axis and provided with first and second balance arm portion, movable relative to each other, each balance arm portion having a first end supporting a respective wheel and a second end, the balance arm portions being connected at their second ends such that an angle between the balance arm portions in an operative position differs from the angle between the balance arm portions in a transport position for transport of the haymaking machine; and
    an element that can be actuated to pivot the first balance arm portion to the transport position in which the angle between the balance arm portions is reduced whereby actuation of the element also causes the wheel of the second balance arm portion to be raised to a distance from the ground.

2. The crop processing machine as claimed in claim 1, wherein, when the machine is moved from the operative position to the transport position, the balance arm portions are freely movable relative to each other, so that the angle between the balance arm portions in the operative position differs from the angle between the balance arm portions in the transport position.

3. The crop processing machine as claimed in claim 1, wherein the difference between the angle between the balance arm portions in the operative position and the angle between the balance arm portions in the transport position lies in the range between approximately 30° and approximately 90°.

4. The crop processing machine as claimed in claim 1, wherein the balance arm portions are pivotably mounted relative to each other about the pivot axis.

5. The crop processing machine as claimed in claim 1, wherein one of the balance arm portions is provided with a stop, and the other balance arm portion is provided with a protrusion, the protrusion bearing on the stop by the weight of the machine in the operative position.

6. The crop processing machine as claimed in claim 5, wherein the position of the stop on the one balance arm portion is adjustable.

7. The crop processing machine as claimed in claim 5, wherein the position of the protrusion on the other balance arm portion is adjustable.

8. The crop processing machine as claimed in claim 5, the frame being provided with a crossbeam, each of the ends of the crossbeam being provided with a supporting device, wherein a stop is disposed near each end of the crossbeam, and in that each other balance arm portion is provided with a further protrusion, the further protrusion of the other balance arm portion bearing on the respective stop of the crossbeam during transport of the machine.

9. The crop processing machine as claimed in claim 8, wherein the stop near each end of the crossbeam is constituted by the respective edge of a slotted hole.

10. The crop processing machine as claimed in claim 8, wherein the crossbeam is provided with auxiliary protrusions which, in the operative position of the machine, press on at least one of the balance arm portions by the weight of the machine.

11. The crop processing machine as claimed in claim 1, wherein the wheel at at least one of the ends of the balance arms is a double wheel.

12. The crop processing machine as claimed in claim 1, wherein the element for pivoting at least one balance arm portion to the transport position comprises an actuator acting between the frame and the balance arm portion.

13. The crop processing machine as claimed in claim 1, wherein the element for pivoting at least one balance arm portion to the transport position comprises an actuator acting between the balance arm portions.

14. The crop processing machine as claimed in claim 1, comprising a processing member rotatable about an upwardly orientated axis.

15. A machine comprising a supporting device for supporting the machine from the ground, the supporting device being provided with at least one balance arm that is mounted on a substantially horizontal pivot axis and is provided with wheels, the supporting device further being provided with an element for moving the balance arm about its pivot axis to an oblique position in which at least one of the wheels, but not all the wheels, is located at some distance from the ground, so that the machine is moved from an operative position, in which the wheels bear on the ground, to a transport position, in which at least one of the wheels is located at some distance from the ground, wherein the balance arm comprises two balance arm portions that are freely movable relative to each other, each balance arm portion having a first end and a second end, the balance arm portions supporting the respective wheel at their first end and being interconnected at their second end, so that the angle between the balance arm portions in the operative position differs from the angle between the balance arm portions in the transport position.

16. The crop processing machine as claimed in claim 15, wherein the balance arm portions are pivotably mounted relative to each other about the pivot axis.

17. The crop processing machine as claimed in claim 15, wherein the difference between the angle between the balance arm portions in the operative position and the angle between the balance arm portions in the transport position lies in the range between approximately 30° and approximately 90°.

18. The crop processing machine as claimed in claim 15, wherein the element for moving the at least one balance arm portion to the oblique position comprises an actuator acting on the balance arm portion.

19. A haymaking machine comprising a frame, with at least one processing member that is rotatable about an upwardly orientated axis for processing crop lying on the ground in the operative position, the processing member being connected with the frame and being supported from the ground via a supporting device, which comprises at least one balance arm that is mounted on a substantially horizontal pivot axis and is provided with a wheel at each of its ends, the wheels bearing on the ground in the operative position, the supporting device further being provided with an element, operable for moving the balance arm about its pivot axis to an oblique position for transport of the haymaking machine, in which the wheel located at one of the ends of the balance arm is at some distance from the ground, wherein the balance arm comprises two balance arm portions that are movable relative to each other on operation of the element, each balance arm portion having a first end and a second end, the balance arm portions supporting the respective wheel at their first end and being interconnected at their second end, so that the angle between the balance arm portions in the operative position differs from the angle between the balance arm portions in the transport position.

* * * * *